United States Patent [19]

Delhaes

[11] Patent Number: 4,662,662
[45] Date of Patent: May 5, 1987

[54] MOUNTING RING FOR FITTING PIPE SECTIONS

[75] Inventor: Johannes C. Delhaes, Heerlen, Netherlands

[73] Assignee: Rubber- en Kunststoffabriek ENBI B. V., Nuth, Netherlands

[21] Appl. No.: 852,537

[22] Filed: Apr. 16, 1986

[30] Foreign Application Priority Data

Apr. 18, 1985 [DE] Fed. Rep. of Germany ....... 3514018

[51] Int. Cl.[4] ............................................. F16L 21/02
[52] U.S. Cl. .................................. 285/379; 285/110; 285/230; 285/345; 277/207 A
[58] Field of Search .............. 285/379, 110, 111, 230, 285/231, 345; 277/DIG. 2, 207 A

[56] References Cited

U.S. PATENT DOCUMENTS 1,920,512 8/1933 Lamont ............................ 285/921 X
4,346,820 8/1982 Cavazza ........................... 285/921 X

FOREIGN PATENT DOCUMENTS 8031491 3/1981 Fed. Rep. of Germany .
526329 9/1940 United Kingdom ................ 285/379

Primary Examiner—Richard J. Scanlan, Jr.
Attorney, Agent, or Firm—W. G. Fasse; D. H. Kane, Jr.

[57] ABSTRACT

A mounting ring of synthetic material for fitting two pipe sections in place relative to each other, has a radial flange (1) and an axial neck (2). Tongues (3, 4, 5, 6) of differing lengths extend radially inwardly and radially outwardly from the neck. These tongues are preferably formed as part of the ring, for example, when molding the ring of synthetic material. The longer radially outer tongues bend over, snap into a groove, and center the ring in a pipe socket. The shorter radially outer tongues support the ring in the socket. When a pipe end is inserted into the socket through the ring the longer radially inner tongues bend and center the pipe in the socket while the shorter radially inner tongues support the pipe end. Thus, the inner surfaces of the pipe sections remain in alignment with each other because the shorter tongues act like spokes against forces acting crosswise on the pipe sections relative to their length.

10 Claims, 8 Drawing Figures 4,662,662

MOUNTING RING FOR FITTING PIPE SECTIONS

FIELD OF THE INVENTION

The invention relates to a mounting ring for coaxially fitting a pipe end of one pipe section into a pipe socket of another pipe section. Such rings have an angle sectional configuration with a flange ring portion extending radially and connected to a neck ring portion extending axially.

DESCRIPTION OF THE PRIOR ART

Such a mounting ring is disclosed in German Utility Model Publication No. 8,031,491. The purpose of the known mounting ring is to keep a sealing ring within the pipe socket by preventing any unintended axial displacement of the sealing ring when a pipe end of one pipe section is inserted into the pipe socket of another pipe section. Such a known mounting ring is supposed to keep the sealing ring in place even if an excess pressure is present in a pipe system. During the insertion of a pipe end into the pipe socket there is the danger that the sealing ring is pushed too far into a ring space formed between the radially outer surface of the pipe section and the radially inner surface of the pipe socket. By inserting the sealing ring too deeply into the ring space or by irregularly deforming the sealing ring, the formation of a proper seal may be prevented. Similarly, a proper seal may not result when the internal pressure of the pipe system causes the sealing ring to move axially outwardly in the mentioned ring space, whereby the sealing ring might partially or even entirely, be pressed out of the ring space. In all these past instances a proper sealing is not assured when it is not possible to successfully keep the sealing ring in a stable, fixed position in the pipe socket.

Other mounting rings are known in the art in numerous versions. However, such known mounting rings are substantially limited in their function to the securing of the sealing ring. Several different versions comprise divided ring sections with overlapping ends to permit a widening of the ring, whereby the overlapping ends are so constructed that the widened or spread out ring retains its enlarged diameter for securing the sealing ring.

The sealing rings made of elastomeric material in prior art structures are not capable, or rather, not capable over prolonged periods of time, to maintain the two pipe sections in a position in which the inner surfaces of the pipe sections remain in axial alignment with each other. This is so even if the sealing rings are properly fixed within the ring space between the pipe socket and the pipe end. Due to forces which are effective on the individual pipe sections in different directions and in different sizes, the pipe sections are subjected to shearing stress which can cause uncontrollable displacements of the individual pipe sections relative to neighboring pipe sections. As a result, the internal wall surfaces of pipes in a system do not remain in alignment with each other so that steps of various sizes can occur between the inner pipe surface of one pipe and the inner pipe surface of the next adjacent pipe in the system. The formation of such steps is also facilitated by the unavoidable tolerances in sizes from one pipe section to the next and these tolerances increase with the pipe dimensions. An insufficient alignment of the internal pipe surfaces, however, is undesirable because it results in dead spaces at the interface between two pipe sections where deposits may be accummulated in the pipe system. Such deposits may eventually cause clogging of the pipe system.

OBJECTS OF THE INVENTION

In view of the foregoing it is the aim of the invention to achieve the following objects singly or in combination:

to construct a mounting ring so that it has simple features and thereby its production costs are advantageously reduced;

to construct a mounting ring in such a way that it is capable of performing two functions simultaneously, namely, keeping the sealing ring in place in the above mentioned ring space even while taking into account the customary size tolerances of the pipe sections, and to properly center the end of one pipe section when it is inserted into the pipe socket of the other pipe section; and to construct a mounting ring of the type disclosed in such a way that it is capable of taking up the shearing forces effective on the pipe section and to transmit these shearing forces in such a way that the centering of the pipes relative to each other is maintained to assure that the inner wall surfaces of the pipe sections remain aligned with each other and dead spaces are avoided.

SUMMARY OF THE INVENTION

A mounting ring according to the invention comprises a plurality of radially extending tongues which are distributed about the radially outer and the radially inner circumference of the neck section of the mounting ring, whereby in the circumferential direction neighboring tongues have different lengths, and wherein all tongues of the same length are arranged with the same spacing from each other. Preferably, uniform spacings are provided between the tongues.

By giving these tongues differing lengths and by uniformly distributing these tongues along the outer and inner circumferences of the ring neck section, the mounting rings according to the invention are capable of first centering the mounting ring in the socket and then centering the pipe end in the socket and in the mounting ring. This centering is assured because a determined number of radially outwardly extending tongues of larger length contact the inner wall surface of the pipe socket in accordance with the exact diameter sizes of the ring space inside the pipe socket, and because a determined number of radially inwardly extending tongues of larger lengths contact the outer surface of the pipe section, whereby these tongues are bent over, thereby facilitating first the centering of the ring in the socket and then of the pipe end in the ring and socket. Such centering makes the pipe insertion easier. Preferably, the inner wall surface of the pipe socket is provided with at least one ring groove. The ends of the radially outwardly extending tongues snap into this ring groove to arrest the mounting ring in the pipe socket, whereby any axial movement of the mounting ring out of the pipe socket is effectively prevented. Another number of tongues having a shorter radial length radially inwardly and radially outwardly will not be bent when the mounting ring is inserted into the pipe socket. Thus, these shorter tongues contact the inner wall surfaces of the pipe socket and the outer wall surface of the pipe end, whereby the shorter tongues are capable of acting in the manner of spokes to take up cross forces on the pipes without being deformed. It has been found, surprisingly, that a uniformly distributed number of relatively thin tongues is completely sufficient for properly transmitting even extraordinarily high cross forces effective on a pipe system equipped with the present mounting rings, thereby effectively preventing the above mentioned formation of dead spaces at the junctions between two pipe sections.

According to another embodiment of the invention, the free ends of the radially outwardly extending tongues having the maximum length are located on a radius which is larger than the maximum outer diameter of the ring space. On the other hand, the free ends of the radially inwardly directed tongues of maximum length are located on a radius which is larger than the minimum radius of the ring space. The free ends of the radially outwardly extending tongues of minimum length are located on a radius which is equal to or smaller than the minimum outer radius of the ring space. The free ends of the radially inwardly directed tongues of minimum length are located on a radius which is equal to or larger than the maximum inner radius of the ring space. The term maximum and minimum outer radius of the ring space and the term maximum and minimum radius of the ring space refer to the permissible tolerances of the pipe socket and pipe end dimensions which define the ring space.

By dimensioning the tongues as just described, it is possible to take into account the most diversified ring space sizes so that in all instances a defined number of tongues is available for transmitting shearing forces, thereby acting in a manner similar to the spokes in a wheel.

It is desirable not to bend too large a number of tongues when inserting the mounting rings into the pipe sockets and when inserting a pipe end into the pipe socket so that the force needed for the mounting is not too large. Thus, it has been found that it is desirable to arrange the tongues with spaces between adjacent tongues in the circumferential direction. Thus, tongues extending radially inwardly are staggered relative to the spaces between tongues extending radially outwardly and vice versa. This feature has the advantage that a sufficient tongue cross-sectional area is available for the supporting function without requiring a large number of tongues. It is further desirable, particularly with regard to satisfying the requirements of molding these mounting rings from synthetic materials, that the tongues are axially staggered. In other words, one set of tongues is located axially a little closer to the ring flange than the other set of tongues. The ring sections and the tongues are formed as a single, integral unitary piece, for example, by injection molding. The force necessary for inserting the mounting ring into the socket and the force necessary for inserting the pipe end into the mounting ring and thus into the pipe socket may be further reduced by the feature according to the invention which teaches using tongues provided at least on one side either radially inwardly, or radially outwardly, near the ring neck section by a notch extending parallel to the plane defined by the respective tongue and perpendicularly to the radial length of the respective tongue.

Another feature of the invention provides ribs which extend axially and separate the tongues into groups, these ribs are uniformly distributed around the circumference, preferably the inner circumference, of the mounting ring. These ribs are oriented radially and have differing radially extending dimensions so that a smaller dimension merges into a larger dimension along a step, such as a slanted step, whereby both of these dimensions have a diameter or radius which is larger than the maximum inner diameter of the ring space. This shape of the ribs, which are known in connection with mounting rings of conventional construction, facilitates substantially the insertion of the pipe end into the pipe socket because the ribs function in the manner of a funnel so that the pipe end is easily inserted into the axially outwardly larger space between the ribs which then lead the pipe end along the slanted portion into the position in the space between the rib portions of largest diameter. Thus, these ribs perform a preliminary type of centering.

BRIEF DESCRIPTION OF THE DRAWINGS

In order that the invention may be clearly understood, it will now be described, by way of example, with reference to the accompanying drawings, wherein:

FIG. 5 and FIG. 6 are shown on a relatively reduced scale.

DETAILED DESCRIPTION OF PREFERRED EXAMPLE EMBODIMENTS AND OF THE BEST MODE OF THE INVENTION

Figure 1:
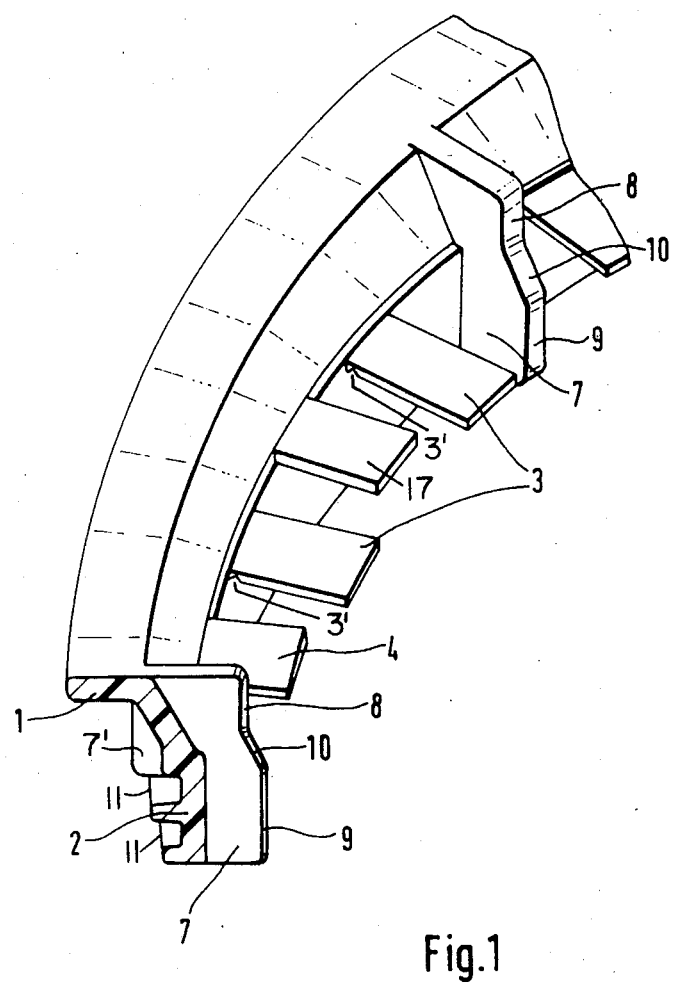
FIG. 1 is a perspective view of a segment of a mounting ring according to the invention having, for example, radially inwardly reaching tongues of three different radial lengths.

FIG. 1 shows a segment of a mounting ring according to the invention comprising a ring flange section 1 and a ring neck section 2. The flange 1 extends approximately at right angles to the neck section 2 which extends substantially axially relative to the longitudinal axis of pipe sections to be joined. Several tongues of different lengths extend radially inwardly from the neck section. The tongues 3 have a maximal length and the tongues 4 have a minimal length while the tongues 17 are of intermediate lengths. The radially outwardly extending tongues are not visible in FIG. 1. The radially outer tongues 5 and 6 are visible, for example, in FIG. 3, wherein the tongues 5 have a maximum radially outwardly extending length and the tongues 6 have the required minimum radially outwardly extending length.

The rings further comprise axially extending ribs 7 which are so spaced about the circumference of the ring that a number of longer and shorter tongues are located between neighboring ribs 7. These ribs 7 have a radially outwardly extending section 7' and a radially inwardly extending section having three portions of different radially inwardly extending dimensions. Thus, the rib portion 8 extends radially inwardly to a lesser degree than the larger portion 9. The portions 8 and 9 are interconnected with a slanting portion 10. This shape of the radially inwardly extending edge of the ribs 7 facilitates the insertion of a pipe section into the mounting ring because the slanted edge portion 10 acts like a funnel. At least certain of the tongues, for example the tongues 3, have a notch 3' extending in parallel to the plane defined by the respective tongue and substantially perpendicularly to the radial length of the respective tongue.

FIG. 1 also shows that the tongues are axially staggered. Thus, for example, the tongues 4 and 17 are located axially outwardly while the tongues 3 are located axially inwardly relative to the axial length of the mounting ring. This axial staggering facilitates the molding of the rings, for example, by injection molding of synthetic materials.

Figure 2A:
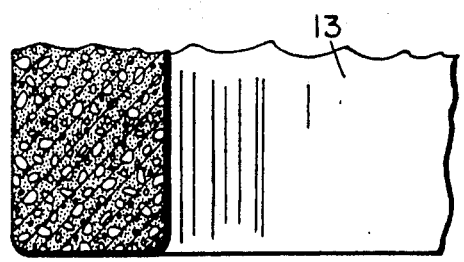
FIG. 2A is a fragmented section through a pipe end.
Figure 2B:
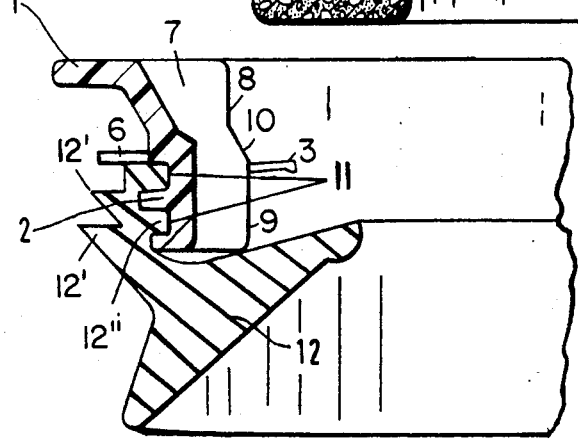
FIG. 2B is a sectional view through an assembly of a sealing ring and a mounting ring according to the invention.
Figure 3:
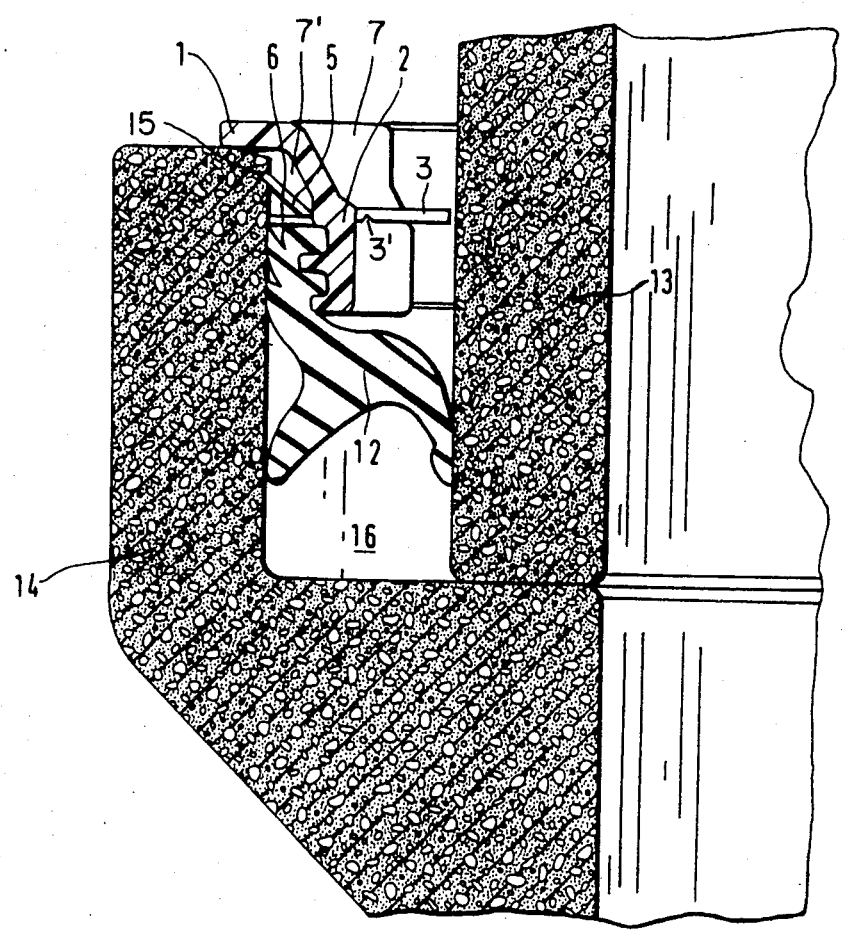
FIG. 3 is a sectional view through a pipe end and pipe socket forming a relatively large ring space in which the assembly of FIG. 2B is inserted.

The radially outer surface the ring section 2 is provided with grooves 11 for holding respective ribs 12" of a conventional sealing ring 12 as shown, for example, in FIGS. 2B and 3. The sealing ring 12 is also provided with radially outwardly extending ring portions 12' which rest against the inner surface of a pipe socket 14 as best seen in FIG. 3. The sealing ring 12 is made of an elastomeric material.

Figure 2C:
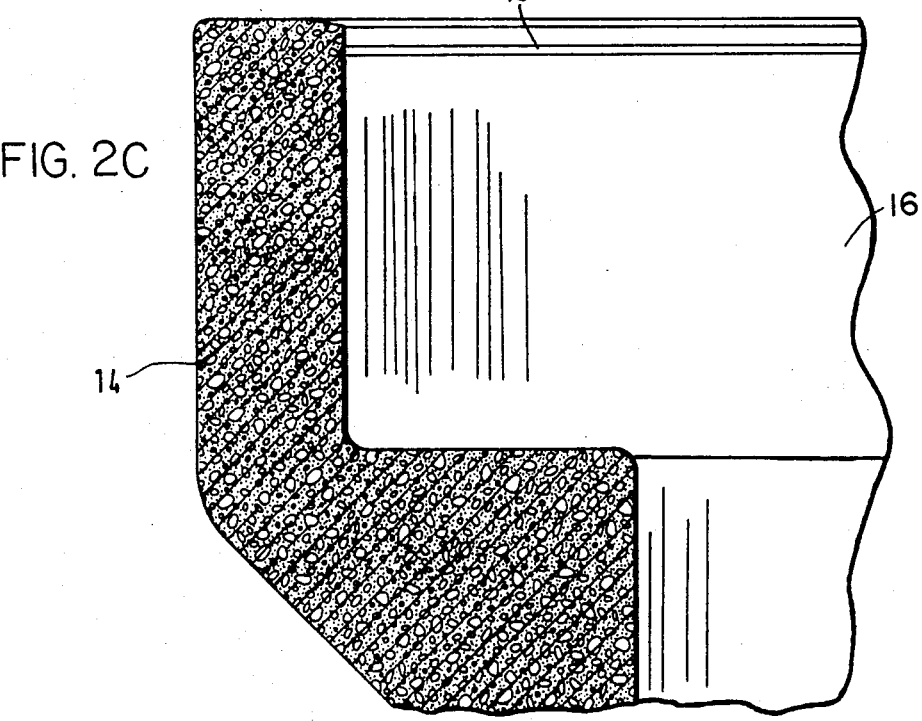
FIG. 2C is a sectional view through a pipe socket into which the mounting ring and sealing ring combination of FIG. 2B is to be inserted together with the pipe end shown in FIG. 2A.
Figure 4:
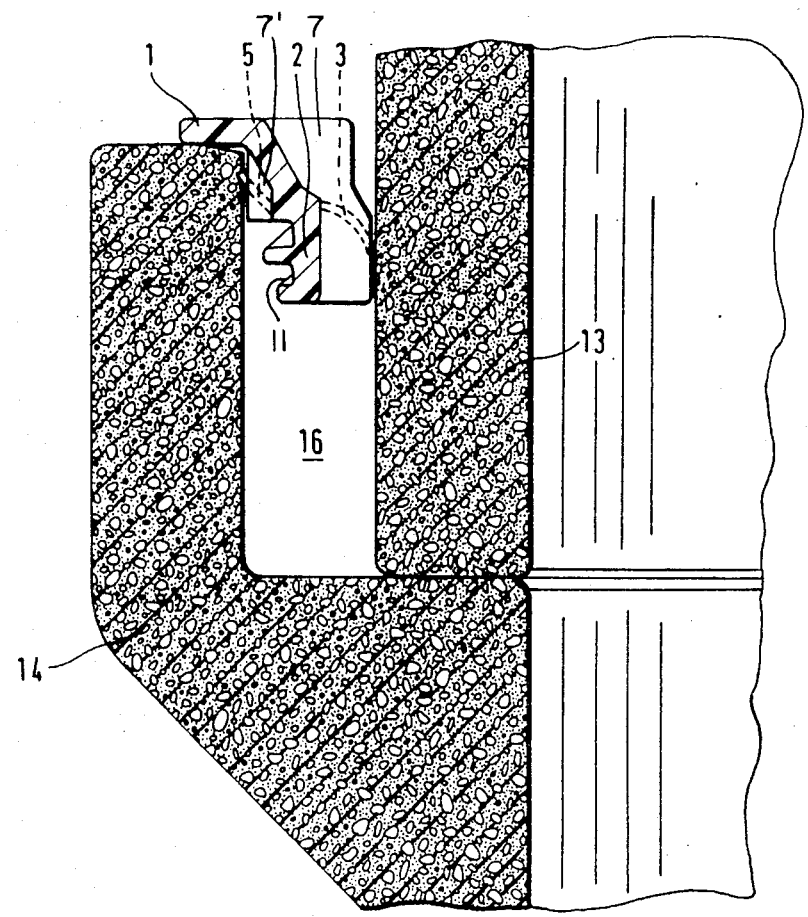
FIG. 4 is a view similar to that of FIG. 3, however, showing a smaller ring space with a mounting ring according to the invention inserted into the ring space.

FIG. 2A shows a pipe end 13 for insertion into the pipe socket 14 shown in FIG. 2C. The pipe socket 14 is provided with one or more ring grooves 15 for locking the mounting ring in place when a radially outwardly longer tongue 5 snaps into the groove 15 as best seen in FIG. 3. If several ring grooves 15 are provided their axial spacing from each other will be relatively small. FIG. 2B shows the assembly of the above mentioned sealing ring 12 held with its ribs 12" in the ring grooves 11 of the mounting ring. Only two tongues 3 and 6 are shown in FIG. 2B. As shown in FIGS. 3 and 4, the radially outer surface of the pipe end 13 and the radially inner surface of the pipe socket 14 define a ring space 16 which may have different radial dimensions depending on the maximum and minimum inner radial dimensions of the pipe socket 14 and the maximum and minimum radially outer dimensions of the pipe end 13.

When the mounting ring is inserted into the pipe socket 14, the radially outwardly extending longer tongues 5 are bent over and, due to their elasticity, snap into the ring groove 15 as best seen in FIG. 3. Thus, the mounting ring is fixed in place because it cannot move axially inwardly since its flange 1 rests on the axially outwardly facing rim of the pipe socket 14 and since the ring cannot move axially outwardly because the tongues 5 extending at a slant relative to the longitudinal axis of the pipe section, rest with their outer free ends in the groove 15. Additionally, the mounting ring is properly centered in the ring space 16 because the shorter radially outer tongues 6 are not bent over and bear against the radially inner surface of the pipe socket 14.

If now the pipe end 13 is inserted into the ring space 16 through the mounting ring the bending will depend on the outer diameter of the pipe end 13. Thus, in FIG. 3 even the longer radially inner tongues 3 are not bent over. However, these tongues make sure that the above mentioned spoke action is fully effective to take up forces which may cause a shifting of the pipe sections relative to each other and relative to their longitudinal central axis. In FIG. 4 the radially outer diameter of the pipe section 13 is larger so that the longer radially inner tongues 3 are bent over as shown. The sealing ring is omitted for simplicity's sake in FIG. 4. A ring groove corresponding to the ring groove 15 has been found to be unnecessary on the outer surface of the pipe end 13. However, such a ring groove could be provided in the outer surface of the pipe end 13 if desired. The shorter tongues 4, not shown in FIG. 4, retain their radial position and bear against the outer surface of the pipe end so that again the spoke effect is assured. In both instances, in FIG. 3 and in FIG. 4, the proper centering of the pipe end 13 in the socket 14 is assured so that the inner surfaces of the pipe sections remain aligned relative to each other even when the pipe sections are exposed to forces extending crosswise to the longitudinal axis of the pipe sections. Thus, the formation of dead spaces is avoided.

Figures 5, 6:
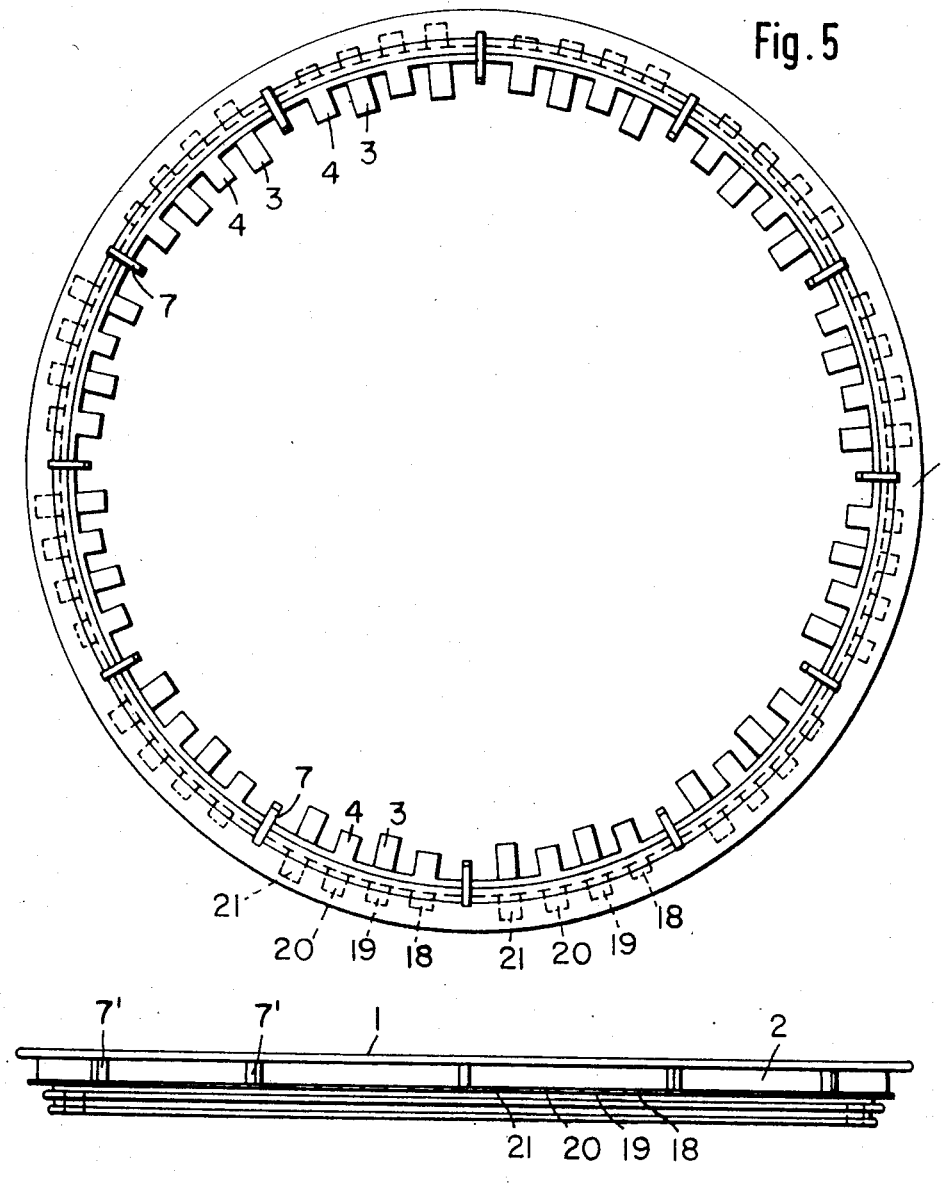
FIG. 5 is a top plan view onto a mounting ring according to the invention having, for example, radially inwardly reaching tongues of two different radial lengths and radially outwardly reaching tongues of several different lengths.
FIG. 6 is a side view of the ring according to FIG. 5, whereby both

The top plan view of FIG. 5 illustrates an embodiment with radially inwardly reaching tongues having two different radial lengths, whereby the shorter radially inwardly extending tongues 4 alternate with the longer radially inwardly extending tongues 3. The axial ribs 7 separate groups of these inner tongues. The tongues are uniformly spaced around the circumference. FIG. 5 further shows that the radially outwardly extending tongues 18, 19, 20, and 21 form groups of tongues which have stepped radially outwardly extendings lengths. FIG. 6 shows that the axially extending ribs 7 have rib sections 7' extending radially outwardly. The stepped arrangement of the tongues is particularly suitable to accommodate large tolerances in the dimensions of the pipe sections. If desired, the radially inwardly extending tongues may also be stepped in their length.

Although the invention has been described with reference to specific example embodiments, it will be appreciated, that it is intended to cover all modifications and equivalents within the scope of the appended claims.

What is claimed is:

1. A mounting ring for coaxially fitting a pipe end of one pipe section into a pipe socket of another pipe section forming a ring space between an outer wall of said pipe end having an outer pipe diameter and an inner pipe socket wall having an inner socket diameter, said pipe sections having a longitudinal central axis and said pipe socket having an axially facing rim, comprising a radially extending ring flange for resting against said pipe socket rim, an axially extending ring neck connected to said ring flange and fitting into said ring space, first outer tongues including at least a set of shorter outer tongues and at least a set of longer outer tongues for providing at least two different radially outer tongue lengths connected to said ring neck, said shorter outer tongues extending substantially radially for centering said mounting ring in said pipe socket, said longer outer tongues extending at a slant relative to said longitudinal central axis in a direction for opposing a withdrawal of said mounting ring from said pipe socket, and second inner tongues including at least one group of shorter inner tongues and at least one group of longer inner tongues for providing at least two different radially inner tongue lengths connected to said ring neck, at least one group of said shorter and longer inner tongues extending substantially radially for centering said pipe end in said mounting ring, said substantially radially extending shorter outer tongues cooperating with said group of substantially radially extending inner tongues for providing a spoke effect for said pipe end in said pipe socket, wherein neighboring tongues have different lengths, and wherein all tongues having the same length are arranged at uniform spacings relative to one another for assuring said coaxial fitting of said pipe sections.

2. The mounting ring of claim 1, wherein said first outer tongues (5, 6) are uniformly distributed around a radially outer circumference of said ring neck, and wherein said second inner tongues (3, 4, 17) are uniformly distributed around a radially inner circumference of said ring neck for facilitating said coaxial fitting.

3. The mounting ring of claim 1, wherein said set of longer outer tongues has free tongue ends located on a circle having a diameter larger than said inner socket diameter for locking said mounting ring in said pipe socket, and wherein said set of shorter outer tongues has free tongue ends located on a circle having a diameter approximately equal to said inner socket diameter for supporting said mounting ring in said pipe socket by said spoke effect.

4. The mounting ring of claim 1, wherein said group of longer inner tongues has free tongue ends located on a circle having a diameter smaller than said outer pipe diameter for centering said one pipe section in said mounting ring, and wherein said group of shorter inner tongues have free ends located on a circle having a diameter approximately equal to said outer pipe diameter for supporting said one pipe section in said pipe socket by said spoke effect.

5. The mounting ring of claim 1, comprising, in addition to said longer and shorter outer and inner tongues, further outer and inner tongues of intermediate length arranged so that said intermediate length tongues are positioned between a shorter tongue and a longer tongue.

6. The mounting ring of claim 1, comprising, in addition to said longer and shorter outer and inner tongues, further tongues of several different intermediate lengths arranged so that groups of tongues with gradually increasing lengths are formed.

7. The mounting ring of claim 1, wherein said shorter and longer tongues are spaced from one another in the circumferential direction relative to said central axis, and wherein neighboring tongues are also staggered in the direction of said central axis.

8. The mounting ring of claim 1, wherein at least certain of said tongues have a notch 3 extending in parallel to a plane defined by the respective tongue and substantially perpendicularly to the radial length of the respective tongue.

9. The mounting ring of claim 1, further comprising axially extending ribs (7) radially inwardly on said neck, said ribs having stepped radial dimensions smaller than said outer pipe diameter.

10. The mounting ring of claim 9, wherein said ribs have an axial length corresponding substantially to an axial ring length.

* * * * *